March 15, 1932.  F. W. GAY  1,849,518
POWER SUPPLY SYSTEM
Filed Jan. 22, 1929
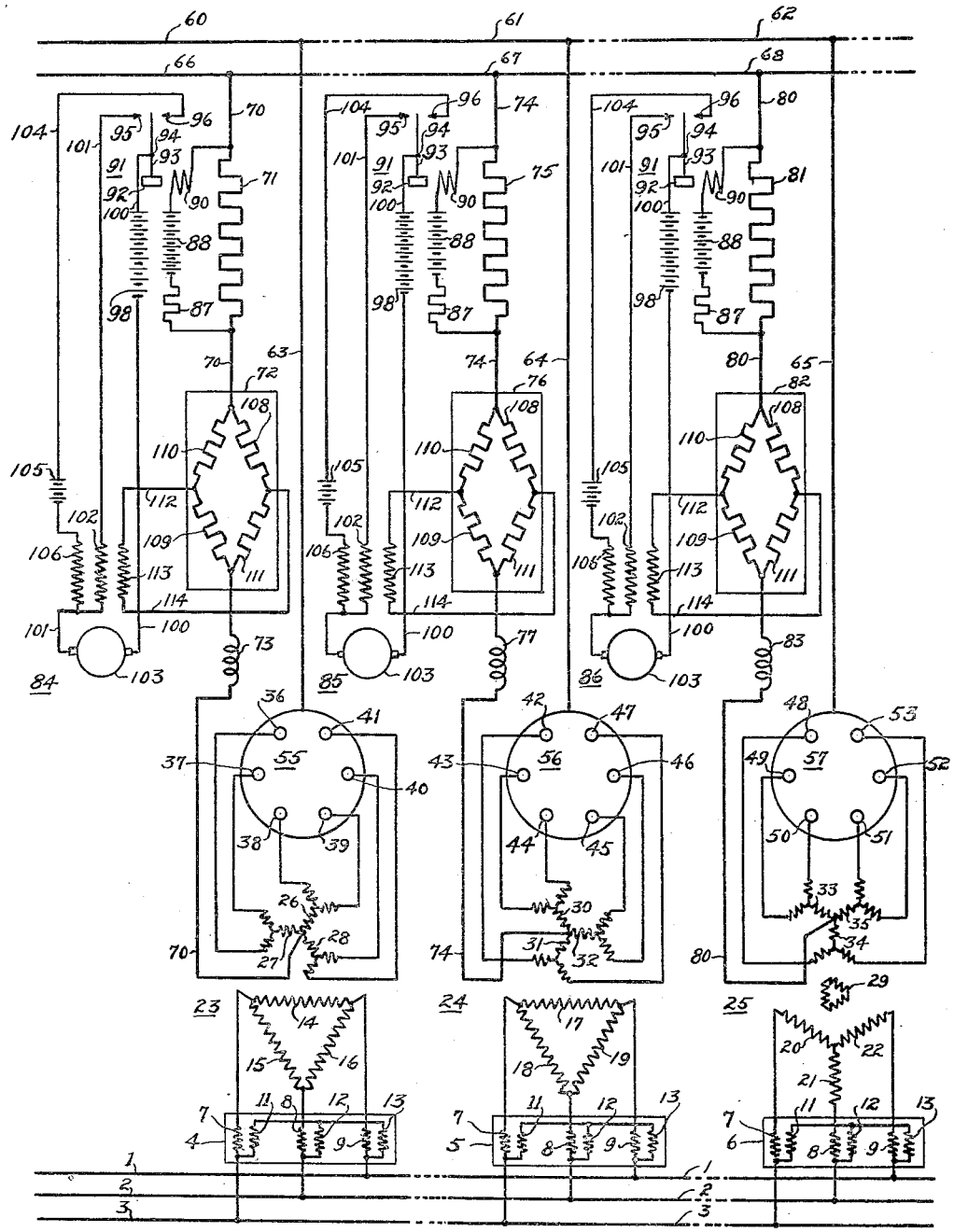
INVENTOR.
FRAZER W. GAY
BY
George D. Richards
ATTORNEY.

Patented Mar. 15, 1932

1,849,518

UNITED STATES PATENT OFFICE

FRAZER W. GAY, OF NEWARK, NEW JERSEY

POWER SUPPLY SYSTEM

Application filed January 22, 1929. Serial No. 334,142.

This invention relates, generally, to electric power supply systems, and the invention has reference, more particularly, to improvements in power supply systems for high voltage direct current railway circuits and especially such of these circuits as are supplied through mercury arc rectifiers.

Heretofore, such direct current railway circuits have been fed by a series of power substations, each of these substations having sufficient equipment including arc rectifiers to carry a peak load as such load passed the substation, and in addition each substation was equipped with additional break down or emergency equipment so as to enable the substation to carry a peak load even though one or more of the substation units were disabled. This required a plurality of expensive and similar power supply units in each substation and in order to reduce the initial cost of such an installation to as low a figure as practical the tendency has been to employ large units and to spread the substations at a considerable distance apart, but such practice although reducing the initial investment, results in inefficient operation owing to increased direct current line losses.

To secure overall economical operation of power supply systems of this character it is desirable to spread the power supply units along the railroad right of way in groups of one or two at fairly frequent intervals so that the power may be transmitted at polyphase high voltage to those rectifiers nearest the load and converted to the desired relatively low D. C. voltage as close to the point of use as possible. Such a method enormously reduces the D. C. line losses. Also, the number of rectifier units should be as low as possible and their size should be as large as possible in order to reduce the initial investment to a minimum.

The mercury arc rectifier possesses the desired characteristics required to supply a railway load in the most economical manner as above described under normal conditions and these rectifiers have a very great overload capacity for short periods of time. However, the concentrating of loads at particular points, resulting, for example, from the blocking of traffic temporarily at such points make it impossible under the old system for the local rectifiers to carry such excessive overloads without the employment of considerable spare equipment. The novel system of the present invention while not employing such spare equipment is designed to provide for such excessive overloads.

The principal object of this invention is to provide a novel direct current power supply system for railways wherein a minimum of power supply units are employed at relatively frequent intervals along the railroad right of way and automatic control means is provided for enabling the power supply units to carry a maximum possible overload when desired, such overloads being limited however to the capacity of the power supply units, as determined by their recent past history, and means is also provided for enabling adjacent power supply units to assist an overloaded unit in carrying its temporary peak loads.

In carrying out the invention, the A. C. voltage impressed on each rectifier of the power supply units is controlled so that at any instant the voltage on one of these rectifiers is adjusted to avoid an excessive overload maintained for more than a few moments, and in addition this voltage is adjusted over longer time intervals so that the mean load of the rectifier is allowed to carry is an inverse function of the load it has carried over a predetermined previous interval. Under this system local rectifiers continue to carry short time peaks of great value, while the D. C. line will supply a comparatively steady supply of power from both directions towards the overloaded section, thereby reducing line losses to a minimum and supplying a smooth voltage to train motors. Under the present invention, during such temporary periods of excessive overload, the additional power required is adapted to be supplied from the neighboring substations positioned at each side of the station subjected to the excessive overload. Under the old system such short time excessive peak loads would commonly kill the voltage at the heavily loaded points and give a very irregular voltage supply at all points except those immediately adjacent the substations resulting in damage to train motors.

The novel method of voltage control employed in the present invention consists in utilizing a motor controlled largely by a relay shunted across a special resistance in the rectifier D. C. rail circuit. Such a motor is utilized for increasing or decreasing the secondary voltage of the transformer feeding each rectifier. This motor operates to decrease such voltage when the rectifier is overloaded and to increase the same when the rectifier is underloaded. The method used in the case of transformers of high voltage will generally consist of tap changing under load preferably on the primary winding, while on low voltage primaries the primary voltage may most conveniently be varied by employing induction regulators for this purpose. The motor is adapted to run at a high speed when reducing load on a rectifier and to run at a relatively low speed when increasing load on the rectifier. Means is provided for greatly accelerating the rate of reducing load on a rectifier when the overload is very great, the rate of load reduction in such case being substantially proportional to the square of the overload. The rate of reduction of load is further influenced by the previous history of the rectifier, i. e. if the machine has recently been subjected to a high overload, the rate of reducing load will be much greater than if the rectifier is cold when the overload occurs.

Other objects of this invention, not at this time more particularly enumerated, will be clearly understood from the following detailed description of the same.

The invention is clearly illustrated in the accompanying drawing, in which:—

The single figure of the drawing is a diagrammatic representation of the novel power supply system of this invention applied to a railway system.

Similar characters of reference are employed in the hereinabove described view to indicate corresponding parts.

Referring now to the said drawing, 1, 2, 3 designates a three phase power line extending adjacent the railroad right of way. Similar induction regulators 4, 5 and 6 of the three phase type are illustrated as connected to consecutive sections of the power line 1, 2, 3 through suitable circuit breakers (not shown). Induction regulators 4, 5 and 6 would ordinarily be installed in consecutive power substations which are spaced at frequent intervals along the railroad right of way. Each of the induction regulators 4, 5 and 6 have buck and boost windings 7, 8 and 9 and shunt windings 11, 12 and 13. The induction regulators 4, 5 and 6 are adapted to supply electrical energy at a variable voltage to the primary windings 14, 15 and 16; 17, 18 and 19; and 20, 21 and 22 respectively of power transformers 23, 24 and 25. Transformers 23 and 24 are illustrated as delta-star connected and transformer 25 is provided with a delta winding 29.

The secondary windings of transformers 23 and 24 are illustrated as one hundred and twenty degrees out of phase so that the phase displacement of harmonic currents will be different between adjacent machines, i. e. the harmonic currents produced in both the A. C. and D. C. circuits associated with each successive transformer will not be additive to those produced in the next preceeding or succeeding transformer. Transformer 24 instead of being delta-star connected may be star-star connected in which case transformer 25 would be delta-star connected.

The secondary windings 26, 27 and 28; 30, 31 and 32; and 33, 34 and 35 of these power transformers are wound to provide six phase current. The secondary windings 26, 27 and 28 of transformer 23 are adapted to supply their induced power to the six anodes 36 to 41 of a mercury arc rectifier 55. Also, the secondary windings of transformers 24 and 25 are adapted to supply their induced power to the anodes 42 to 47 and 48 to 53 of mercury arc rectifiers 56 and 57 respectively.

The mercury arc rectifiers 55, 56 and 57 convert the alternating current energy supplied by the transformers 23, 24 and 25 to direct current and furnish this direct current to consecutive sections 60, 61 and 62 of a high voltage railroad trolley system. The mercury arc rectifiers 55, 56 and 57 and their control equipment are housed in consecutive power substations along with the respective induction regulators 4, 5 and 6 and are adapted to supply direct current electric energy to consecutive sections of the trolley system.

Supply leads 63, 64 and 65 are employed to conduct current from the cathodes of the rectifiers 55, 56 and 57 to the sections 60, 61 and 62 of the trolley system. Rail sections 66, 67 and 68 correspond to the trolley sections 60, 61 and 62 respectively. Rail section 66 is connected by a lead 70 through a resistance 71, a bridge resistance 72 and a choke coil 73 to the neutral of the secondary windings of transformer 23. Rail section 67 is similarly connected by a lead 74 through a resistance 75, a bridge resistance 76 and a choke coil 77 to the neutral of the secondary windings of transformer 24. Also, rail sections 68 is connected by a lead 80 through a resistance 81, a bridge resistance 82 and a choke coil 83 to the neutral of the secondary windings of transformer 25.

Resistance 71 and bridge resistance 72 together with their associated apparatus are adapted to control a motor 84 which operates the induction regulator 4 to thereby vary the voltage impressed upon the primary windings of transformer 23. This results in corresponding changes in the voltage supplied to the rectifier 55 and hence in the voltage delivered by this rectifier to the trolley section 60. Resistance 75 and bridge resistance 76 and their associated apparatus likewise are adapted to control a motor 85 which operates the induction regulator 5. Also, resistance 81 and bridge resistance 82 and their associated apparatus are adapted to control a motor 86 which operates the induction regulator 6. Since these sets of resistances and their associated apparatus are similar, only the first set of resistances and associated apparatus controlling the motor 84 will be described in detail.

Resistance 71 is made of a metal, such as iron, having a temperature coefficient that is relatively high and which is adapted to cause this resistance to have a temperature time constant that closely approximates that of the rectifier 55. For example, should the rectifier 55 have a continuous current rating of one thousand amperes and a rating of fifteen hundred amperes for a short time, then the resistance 71 may be designed to have a resistance of .002 ohms when cold and a resistance of .003 ohms after a continuous load of one thousand amperes. If a load of one thousand amperes will cause a drop of three volts across resistance 71 when this resistance is hot, as the result of a continuous load for example, then a load of fifteen hundred amperes would also cause a drop of three volts across this resistance provided the resistance were cold and a corresponding greater drop if the resistance were hot.

A relay circuit comprising a resistance 87, a source of constant potential such as a battery 88 and a coil 90 of a polarized relay 91 is arranged in shunt with the resistance 71. Under the preceding quantitative assumptions, battery 88 would be adjusted to provide a terminal voltage of three volts. The resistance 87 acts to limit current flow in the relay circuit when current flow in the resistance 71 is either relatively low or relatively high. Polarized relay 91 has an armature 92 which is mounted upon a relay arm 93 that is pivoted at 94 and which is suitably dampened. Relay arm 93 is adapted to contact with either one or the other of a pair of spaced contacts 95 and 96 depending upon the direction of flow of current in the relay coil 90.

When relay arm 93 engages the contact 95, a circuit is completed from a battery or other source of current supply 98 through a lead 100, relay arm 93, contact 95, a lead 101, a lowering field winding 102 of motor 84, armature 103 of motor 84 and lead 100 back to battery 98. With this circuit completed, the motor 84 operates the induction regulator 4 so as to lower the voltage impressed upon the primary windings of transformer 23 and hence that impressed upon the rectifier 55.

When relay arm 93 engages the contact 96, a circuit is completed from battery 98, through lead 100, relay arm 93, contact 96, a lead 104, a bucking battery 105, a raising field winding 106 of motor 84, armature 103, and lead 100 back to battery 98. Raising field winding 106 and lowering field winding 102 are of reverse polarities, so with field winding 106 energized, motor 84 has a direction of rotation that is opposite its direction of rotation when field winding 102 is energized. This motor now operates the induction regulator 4 so as to raise the voltage impressed upon the primary windings of transformer 23 and hence that impressed upon the rectifier 55. Bucking battery 105 lowers the voltage impressed upon and hence the raising speed of motor 84 so that the rate of raising the voltage impressed upon the rectifier 55 is slower than the rate of lowering the voltage accomplished upon the engagement of relay arm 93 with contact 95. Bucking battery 105 is ordinarily adjusted to make the raising speed of motor 84 substantially one half the lowering speed of this motor.

Bridge resistance 72 comprises two parallel circuits of two resistances each. Resistance 108 of one of these parallel circuits is similar to resistance 109 of the other of these circuits. Resistances 108 and 109 are made of a material having a very high positive coefficient of resistance while the remaining resistances 110 and 111 of these circuits are preferably made of a material having a negative temperature coefficient of resistance. Resistances 110 and 111 are also similar in magnitude. All four of these resistances 108 to 111 are so formed mechanically that they are well ventilated and rise and fall in temperature quickly with changes in load.

The inner ends of resistances 110 and 109 are connected by a lead 112 to one end of an auxiliary field winding 113 of motor 84. The other end of field winding 113 is connected by a lead 114 to the inner ends of resistances 108 and 111. Field winding 113 in conjunction with resistance 72 is adapted to control the speed of motor 84.

The resistances 108 to 111 may have any desired suitable ohmic values. It is to be assumed, for example, that the resistance of each of the similar resistances 108 and 109 is .002 ohms when these resistances are cold, that after the rectifier 55 has been carrying its full load continuously for some time the resistance of 108 and 109 has increased to .0025 ohms and that after rectifier 55 has been carrying two hundred per cent load for a few minutes these resistances have an ohmic value of .004 ohms. Also, resistances 110 and 111 may be assumed to have a resistance of .003 ohms when cold, which decreases to .0028 ohms after rectifier 55 has been carrying its full load continuously for some time and which further decreases to .002 ohms after the rectifier has been carrying two hundred per cent load for a few minutes.

With the rectifier 55 in operation, the return current from track section 66 flowing through lead 70 will divide in resistance 72 passing through the parallel circuits. Since the ohmic values of resistances 110 and 111 are greater than the ohmic value of resistances 108 and 109 (which is small) for all maintained loads on the rectifier 55 up to slight overloads, then during the operation of this rectifier up to slight overloads, a current will flow from resistance 108 through lead 114, upwardly through field winding 113, lead 112 and resistance 109 to lead 70. This direction of current flow in field winding 113 causes this winding to buck the raising field winding 106. Upon the occurrence of a heavy overload however, the ohmic resistances of members 108 and 109 increase greatly becoming more than the resistances of members 110 and 111 and causing the current in auxiliary field 113 to reverse, i. e. a heavy current will flow from member 110 through lead 112, downwardly through field winding 113, lead 114 and member 111 to lead 70. This direction of current flow in field winding 113 causes this winding to buck the lowering field winding 102. It will be evident that loads in excess of two hundred per cent, if maintained for more than a predetermined time will cause bridge resistance 72 to become very hot resulting in a heavy current in field winding 113.

Assuming each of the rectifiers 55, 56 and 57 to have a continuous current rating of one thousand amperes and that the potential drop across each of the resistances 71, 75 and 81 to be three volts when each of these rectifiers are carrying continuously one thousand amperes then the operation of the power supply system is as follows.

Since the batteries 88 have a terminal voltage of three volts, substantially no current will flow through the relay circuits comprising resistance 87, batteries 88, and coil 90, as long as each of the rectifiers are carrying rated current. Under these conditions the polarized relay arm 93 is positioned midway between contacts 95 and 96 as shown in the drawing. Let it be assumed, however, that the load on rail section 67 becomes greater than normal so that the load on rectifier 56 increases above normal. In this event, the increased current flow supplied by rectifier 56 will cause the potential drop across the resistance 75 to increase above three volts. If the increase in load is not great the current in coil 90 will cause relay arm 94 to swing slowly toward the contact 95. If the overload is maintained, contact 95 will be reached by relay arm 93, thereby causing the energization of lowering field winding 102 and armature 103 of motor 85 and effecting, by operation of induction regulator 5, the lowering of the voltage impressed on rectifier 56 and hence reducing the voltage delivered by this rectifier, and the load carried thereby. Since the resistance 75 has substantially the same temperature time constant as that of rectifier 56, the load on this rectifier is only reduced a sufficient amount and for a sufficient time to enable the continued safe operation of this rectifier. That portion of the load in rail section 67 that is not now carried by rectifier 56 is supplied by rectifiers 55 and 57, the current passing from trolley sections 60 and 62 to trolley section 61.

One the other hand, should the load or rail section 67 lighten so that the potential drop across resistance 75 drops to say 2.7 volts, then current in coil 90 will reverse, owing to the presence of battery 88, and relay arm 93 will swing slowly toward contact 96. If this underload is maintained, contact 96 will be reached by arm 93 and raising field winding 106 and armature 103 of motor 85 will become energized causing motor 85 to operate induction regulator 5 to effect a raising of the voltage applied to the transformer 24, thereby increasing the voltage delivered by rectifier 56. Large increases or decreases of load upon rectifier 56 will cause rapid movement of contact arm 96 to effect rapid decrease or increase of load upon the rectifier.

Since the bucking battery 105 is ordinarily adjusted to make the raising speed of motor 85 substantially one-half the lowering speed, it will be noted that when the load on the system is heavy, motor 85 in conjunction with relay 91 will operate to hold the load on rectifier 56 near the desired value, allowing the load to go above this value for approximately one third of the time and keeping it under this value for two thirds of the time. Motors 84 and 86 will similarly control the load on rectifiers 55 and 57 respectively.

Since field windings 102 and 106 are of reverse plurality, and as auxiliary field winding 113 is wound on the same poles as these windings, this auxiliary winding acts to buck the lowering field winding 102 when resistance 76 is hot and to buck the raising field winding 106 when resistance 76 is cold. Thus, if rectifier 56 has been subjected to a heavy overload for perhaps a minute or longer and the motor 85 is operating to lower the voltage impressed on this rectifier, the motor field is weakened by the action of auxiliary field winding 113, causing motor 85 to operate at a high speed to thereby hurry the lowering process. If after the motor 85 has reduced the voltage impressed on rectifier 56 to a safe value, the load on rail section 67 should immediately reduce, causing further reduction in the load on the rectifier, and an operation of relay 91 to increase load, then the hot bridge resistance 76 will produce a current in auxiliary field winding 113 in a direction to strengthen the raising field winding, causing motor 85 to operate at a subnormal speed while increasing the load on the rectifier. Thus the control system takes into consideration the immediate past history of the rectifiers and increases but slowly the load upon a highly heated rectifier. As the bridge resistance 76 cools corresponding to a similar cooling of the rectifier, the speed of operation of motor 85 will increase as desired.

It will thus be apparent that the power supply system of this invention provides a simple means whereby a voltage regulating device operates to maintain an average load on a rectifier, said average load being predetermined and of such value as can be safely carried by the rectifier and which is based on the recent past history of the rectifier. Means is also provided whereby the speed of control varies with the temperature history of the rectifier for the preceeding few minutes, resulting in a rapid lowering of load and a relatively slow raising thereof if this temperature is high and a slow lowering of load and a relatively rapid raising thereof if this temperature is low.

Since resistances 72, 76 and 82 are constructed so as to cool readily these resistances are quickly responsive to variations in loads on the rectifiers. These resistances control auxiliary field winding 113 so that the rate of reducing load is greatly accelerated when the overload is very great, such rate of load reduction being approximately proportional to the square of the overload; i. e. if the time of swinging the induction regulator from full boost to full buck is five minutes for fifty per cent overload then this time will be reduced to approximately one and one-quarter minutes for one hundred per cent overload. On the other hand, the damping of relay arm 93 causes relay 91 to be slowly responsive to load variations on the rectifier. Also since the resistances 71, 75 and 81 are adapted to change in temperature at the same rate as the rectifiers, the relays 91 controlled by these resistances will allow the rectifiers to carry overloads without operating to reduce such overloads when the rectifiers are cool enough to carry such overloads. For example, if a rectifier and its resistance in shunt with relay 91 are cold, the resistance will have a low ohmic value and the relay will permit a relatively heavy load continuing over an appreciable time interval before operating to reduce such load.

It will be noted that all of the mercury arc rectifiers of the power supply system are interlinked so that loads are substantially uniformly distributed over a plurality of rectifiers. In the event of a peak load occurring on a particular rail section resulting, for example, from the temporary blocking of traffic on such rail section, then the rectifiers of the adjoining rail sections will automatically aid in maintaining voltage on the overloaded section without any appreciable drop in voltage anywhere along the overloaded section. This results in efficient operation and long life of operating equipment.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In combination, a direct current railway system, and a power supply system for said railway system, said power supply system comprising, mercury arc rectifiers adapted to supply electrical energy to said railway system, an arrangement adapted to vary and determine the permissible load on each of said rectifiers, said arrangement being responsive to the past load history of said rectifier, and additional means also responsive to the past load history of said rectifier adapted to control the rate of variation of load on each of said rectifiers.

2. In combination, a direct current railway system, and a power supply system for said railway system, said power supply system comprising, mercury arc rectifiers adapted to supply electrical energy to said railway system, means for changing the load on each of said rectifiers, an arrangement associated with each rectifier and slowly responsive to variations in loads on said rectifier for operating said load changing means, and means cooperating with said arrangement and quickly responsive to variations in load on said rectifier for determining the speed of operation of said load changing means.

3. In combination, a direct current railway system, and a power supply system for said railway system, said power supply system comprising, a mercury arc rectifier adapted to supply electrical energy to said railway system, means for varying the load on said rectifier, motor means for operating said load varying means, a relay operable substantially in accordance with the temperature of said rectifier for controlling the operation of said motor means, and means quickly responsive to load variations on said rectifier for varying the speed of said motor means, said last named means being influenced in its operation by the immediately preceding load condition of said rectifier.

4. In combination, a direct current railway system, and a power supply system for said railway system, said power supply system comprising, a mercury arc rectifier adapted to supply electrical energy to said railway system, means for varying the load on said rectifier, motor means for operating said load varying means, a resistance element in the circuit of said rectifier, said resistance element having a temperature time constant that closely approximates that of said rectifier, and a relay responsive to variations in the ohmic resistance of said resistance element for controlling said motor means to thereby cause said load varying means to maintain the load on said rectifier at a safe value.

5. In combination, a direct current railway system, and a power supply system for said railway system, said power supply system comprising, a mercury arc rectifier adapted to supply electrical energy to said railway system, means for varying the load on said rectifier, motor means for operating said load varying means, a resistance element in the circuit of said rectifier, said resistance element having a temperature time constant that closely approximates that of said rectifier, a relay responsive to variations in the ohmic resistance of said resistance element for controlling the operation of said motor means, and an additional resistance element in the circuit of said rectifier and quickly responsive to load changes on said rectifier for varying the speed of operation of said motor means, to thereby retain the load carried by said rectifier within a safe value under all operating conditions.

6. In combination, a direct current railway system, and a power supply system for said railway system, said power supply system comprising, a mercury arc rectifier, a power transformer adapted to supply electrical energy to said rectifier, an induction regulator for regulating the voltage impressed on said transformer and hence on said rectifier, a motor for operating said induction regulator, said motor having an auxiliary field winding, relay means operated substantially in accordance with the temperature condition of said rectifier for controlling the starting and stopping and the direction of rotation of said motor, and means quickly responsive to changes in load on said rectifier for regulating the flow of current in said auxiliary field winding, to thereby vary the speed of operation of said motor and hence the rate of change in the voltage impressed on said rectifier.

7. A power supply system for direct current railways comprising, in combination with a mercury arc rectifier, a power transformer adapted to supply electrical energy to said rectifier, and automatically operated voltage changing means for varying the voltage impressed on said rectifier so that the load which said rectifier carries at any instant is an inverse function of the load which said rectifier has carried over a predetermined previous interval.

8. A power supply system for direct current railways comprising, in combination with a mercury arc rectifier, automatically opearted voltage changing means for varying the voltage impressed on said rectifier such that the rate of reduction of voltage impressed on said rectifier in the event of overload is rapid, whereas the rate of increase of voltage impressed on said rectifier in the event of underload is relatively slow.

In testimony, that I claim the invention set forth above I have hereunto set my hand this 18th day of January, 1929.

FRAZER W. GAY.